United States Patent
Varma et al.

(10) Patent No.: US 10,687,273 B1
(45) Date of Patent: Jun. 16, 2020

(54) PROVISIONING SERVICES BASED ON GEOLOCATION DATA AND ACTIVITY RECOGNITION

(71) Applicant: Bank of America Corporation, Charlotte, NC (US)

(72) Inventors: Jayachandra Varma, Irving, TX (US); Jesse S. Newsom, III, Charlotte, NC (US); Jinna Z. Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/358,006

(22) Filed: Mar. 19, 2019

(51) Int. Cl.
  *H04W 48/14* (2009.01)
  *H04W 24/08* (2009.01)
  *H04W 4/021* (2018.01)
  *H04L 12/24* (2006.01)

(52) U.S. Cl.
  CPC .......... *H04W 48/14* (2013.01); *H04W 4/021* (2013.01); *H04W 24/08* (2013.01); *H04L 41/16* (2013.01)

(58) Field of Classification Search
  CPC ...... H04W 48/14; H04W 4/021; H04W 24/08
  See application file for complete search history.

(56) References Cited

U.S. PATENT DOCUMENTS

| | | | |
|---|---|---|---|
| 6,618,593 B1 | 9/2003 | Drutman et al. | |
| 6,757,544 B2 | 6/2004 | Rangarajan et al. | |
| 7,072,963 B2 | 7/2006 | Anderson et al. | |
| 7,142,876 B2 | 11/2006 | Trossen et al. | |
| 7,408,502 B2 | 8/2008 | Percy et al. | |
| 7,457,628 B2 | 11/2008 | Blumberg et al. | |
| 7,487,112 B2 | 2/2009 | Barnes, Jr. | |
| 7,589,628 B1 | 9/2009 | Brady, Jr. | |
| 7,783,299 B2 | 8/2010 | Anderson et al. | |
| 8,060,582 B2 | 11/2011 | Bliss et al. | |
| 8,135,505 B2 | 3/2012 | Vengroff et al. | |
| 8,655,307 B1 | 2/2014 | Walker et al. | |
| 8,819,255 B1 | 8/2014 | Harrison | |
| 8,892,446 B2 | 11/2014 | Cheyer et al. | |
| 9,092,767 B1 | 7/2015 | Andrews et al. | |
| 9,256,890 B1 | 2/2016 | Schmidt | |
| 2001/0029184 A1 | 10/2001 | I'Anson et al. | |
| 2003/0016166 A1 | 1/2003 | Jandrell | |
| 2004/0034635 A1 | 2/2004 | Czarnecki et al. | |
| 2004/0230571 A1* | 11/2004 | Robertson | G06F 17/30 |

(Continued)

*Primary Examiner* — Ronald B Abelson
(74) *Attorney, Agent, or Firm* — Michael A. Springs

(57) ABSTRACT

An apparatus that matches one or more affiliates to a user includes a memory, a geofencing engine, an artificial intelligence engine, and processing circuitry communicatively coupled to each. The geofencing engine determines a current geofenced area of a mobile device of the user. The artificial intelligence engine determines anticipated needs of the user. The processing circuitry determines, using the affiliate database, a list of candidate affiliates for the current geofenced area, and transmits a query to an affiliate feed for the list of candidate affiliates, where the query is based at least in part on the anticipated need of the user. The processing circuitry determines a first affiliate and a second affiliate based on the query and receives query results for the first affiliate and the second affiliate from the affiliate feed. The results are transmitted to the mobile device for presentation in a user interface.

17 Claims, 3 Drawing Sheets

(56) References Cited

U.S. PATENT DOCUMENTS

| | | |
|---|---|---|
| 2007/0100690 A1 | 5/2007 | Hopkins |
| 2008/0065774 A1 | 3/2008 | Keeler |
| 2008/0167887 A1 | 7/2008 | Marcken |
| 2008/0288355 A1 | 11/2008 | Rosen |
| 2009/0044246 A1 | 2/2009 | Sheehan et al. |
| 2010/0161600 A1 | 6/2010 | Higgins et al. |
| 2010/0211428 A1 | 8/2010 | Duffy et al. |
| 2011/0047146 A1* | 2/2011 | Scott ..................... G06F 17/30 |
| 2012/0010932 A1 | 1/2012 | Satyavolu et al. |
| 2012/0130796 A1 | 5/2012 | Busch |
| 2013/0090130 A1 | 4/2013 | Burrell et al. |
| 2013/0185306 A1 | 7/2013 | Botros |
| 2014/0045516 A1 | 2/2014 | Turgman et al. |
| 2014/0365304 A1 | 12/2014 | Showers et al. |
| 2015/0077276 A1 | 3/2015 | Mitchell et al. |
| 2015/0140994 A1 | 5/2015 | Partheesh et al. |
| 2015/0161697 A1 | 6/2015 | Jones et al. |
| 2018/0158101 A1 | 6/2018 | Baker, III |

\* cited by examiner

PROVISIONING SERVICES BASED ON GEOLOCATION DATA AND ACTIVITY RECOGNITION

TECHNICAL FIELD

This disclosure relates generally to tools used for provisioning services to a user based on mobile device geolocation data. In particular embodiments, the present disclosure is related to a tool that more efficiently and accurately determines relevant affiliates and services for a user based at least in part on the location and anticipated needs of the user.

BACKGROUND

Geolocation data from a mobile device can be used to determine a geographical region in which a user of the mobile device is located. Nearby affiliates such as local businesses (e.g., restaurants, gas stations, and banks) or other locations of potential interest to the user (e.g., libraries, parks, and museums) can be identified in the geographical region. Once identified, the nearby affiliates can be presented to the user via a web browser or an application executed on the user's mobile device. There is a need for improved tools and methods for matching affiliates to users.

SUMMARY OF THE DISCLOSURE

Conventional technology for provisioning services based on geolocation data typically matches affiliates to users based only on location information about the user. Generally, conventional technology uses mobile device geolocation to determine a geofenced area corresponding to the location of the mobile device and the user of the mobile device. Affiliates in the geofenced area can be identified and provided to the user's mobile device such that a list of the affiliates is viewable via a web browser or mobile device application. However, in order to access additional information about services available from a given affiliate, a user must typically navigate to a third-party data source, for example, by clicking on a hyperlink for the affiliate to be directed to the affiliate's website. The user must then review the third-party data source to determine whether the affiliate offers services that match the user's needs.

Conventional systems, such as those described above, pose several technical challenges. For instance, conventional systems can have poor usability and may result in a waste of system resources. Resources are wasted because an unnecessarily large set of affiliates are transmitted to the user device, where many of the affiliates may not be related to the user's actual needs. System and human resources are further wasted by requiring the user to navigate to third-party data sources (e.g., affiliate websites) to determine whether affiliates offer services corresponding to their needs. These tasks of navigating and searching third-party data sources limit the usability of conventional affiliate matching approaches and can result in error. For example, a user may not desire to search through several affiliate websites to determine whether a needed service is available, resulting in a failure to identify the most well-matched affiliates for the user. Moreover, in some cases, information in the third-party data sources may not be properly maintained resulting in poor or incorrect affiliate matching.

The present disclosure provides technical solutions to technical problems of conventional systems, such as those described above. Disclosed herein is an affiliate matching tool and associated methods for automatically matching users to affiliates that are not only geographically appropriate to the user but that can also serve the anticipated needs of the user. In particular, the unconventional affiliate matching tool described herein monitors both mobile device geolocation data and information from a user feed (e.g., a social media feed of the user) to determine a list of relevant affiliates and corresponding services based on both the location of the user and likely events, activities, and/or preferences of the user, using a specially trained artificial intelligence engine.

The affiliate matching tool described herein leverages real-time information from multiple sources to transform continuously monitored geolocation data and data feed information into a dynamic query that is unique to the user's current location information and the user's currently identified anticipated need(s). This user-specific and location-specific query is transmitted to an affiliate feed which includes up-to-date information about available affiliates and their offered services. The affiliate feed may, for example, be updated on a daily, weekly, or monthly basis to provide timely and accurate affiliate service information in response to the query. This information can be served to user devices in real-time, or near real-time, such that the service information is continuously updated in response to dynamic changes to the query, for example, if the location of the user changes and/or the anticipated needs of the user change.

As described in greater detail herein, the present disclosure improves the efficiency and accuracy of the technology used to identify affiliates and their corresponding service information for provisioning this information to a mobile device with much improved ease-of-use. In certain embodiments, the affiliate matching tool facilitates automatic and preemptive suggestions based on a user's location and information in data feed of the user (e.g., a social media feed, e.g., a user account, e.g., a news feed). The affiliate matching tool monitors one or more data feeds to anticipate a set of (e.g., two or more) services needed by the user. This set of services is then used to preemptively (i.e., without requiring a request from the user) determine a set of affiliates and services that are specific to the user's location and anticipated needs. Existing technology fails to provide preemptive affiliate service information.

In some cases, a user might not know what services are best suited for his/her needs. Existing technology cannot correctly match users to affiliates in such instances. The apparatus, systems, and methods of the present disclosure solve this problem by facilitating the determination of appropriate affiliates and the corresponding services without necessarily requiring the requisite user knowledge involved with a conventional user-initiated search. Instead, the affiliate matching tool described herein automatically anticipates the user's needs and thus is not limited by the scope of the user's knowledge.

The affiliate matching tool described herein can obviate the need for a user to individually review services offered by each nearby affiliate to determine if a relevant service is available for a given need. Instead, affiliates can be selectively "filtered" to present affiliates with the greatest probability of usefulness to the user. This "filtering" may also allow the list of affiliates to be more manageable for consumption by the user. For example, thousands of affiliates in a densely populated geographical region may be reduced to a more manageable subset relevant to the user's anticipated needs. Thus, system resources are not wasted because of the presentation of unnecessary affiliates and services that are not relevant to the user.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
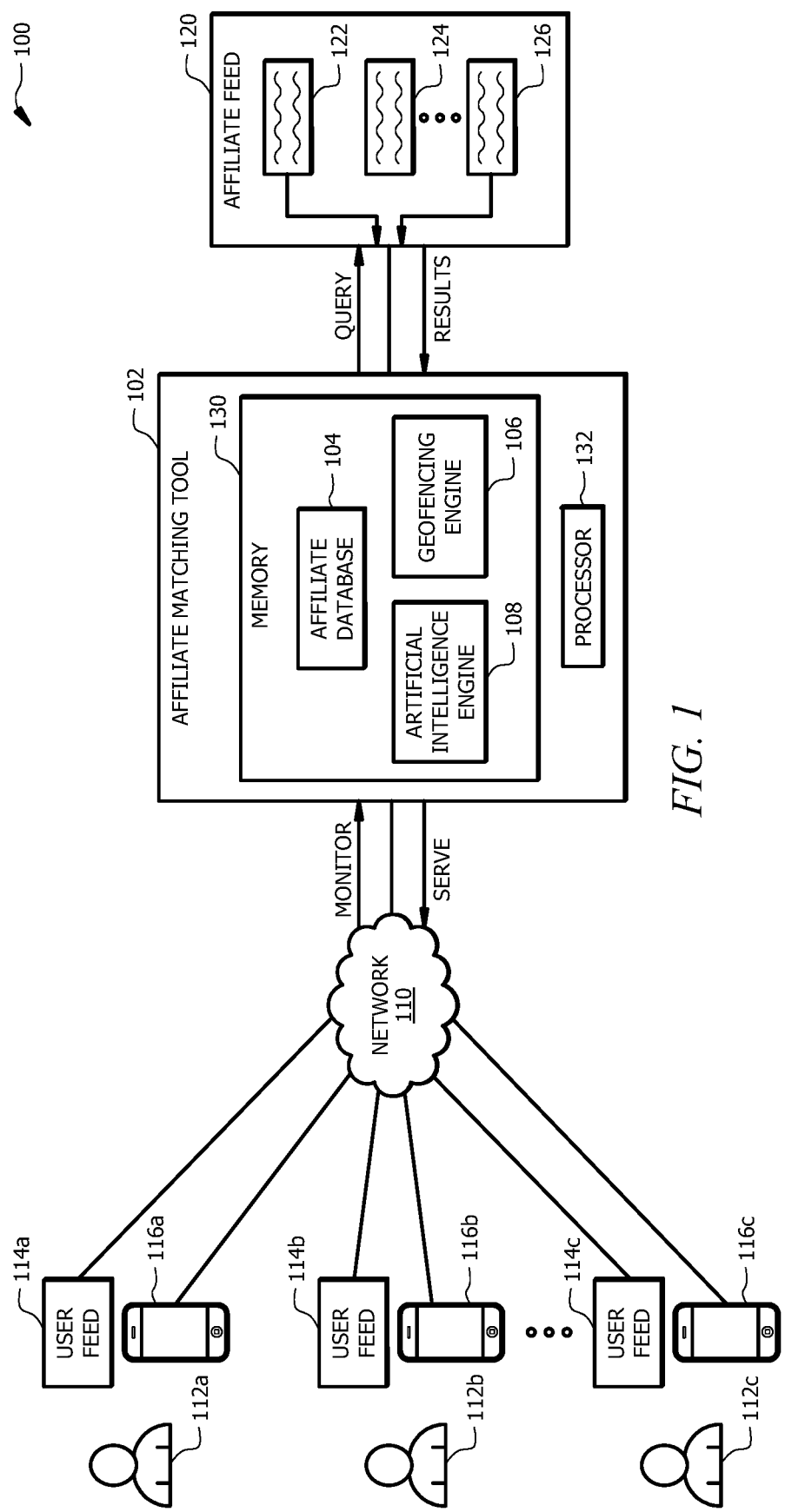
FIG. 1 is a block diagram of an example system, according to an illustrative embodiment of the present disclosure.
Figure 2:
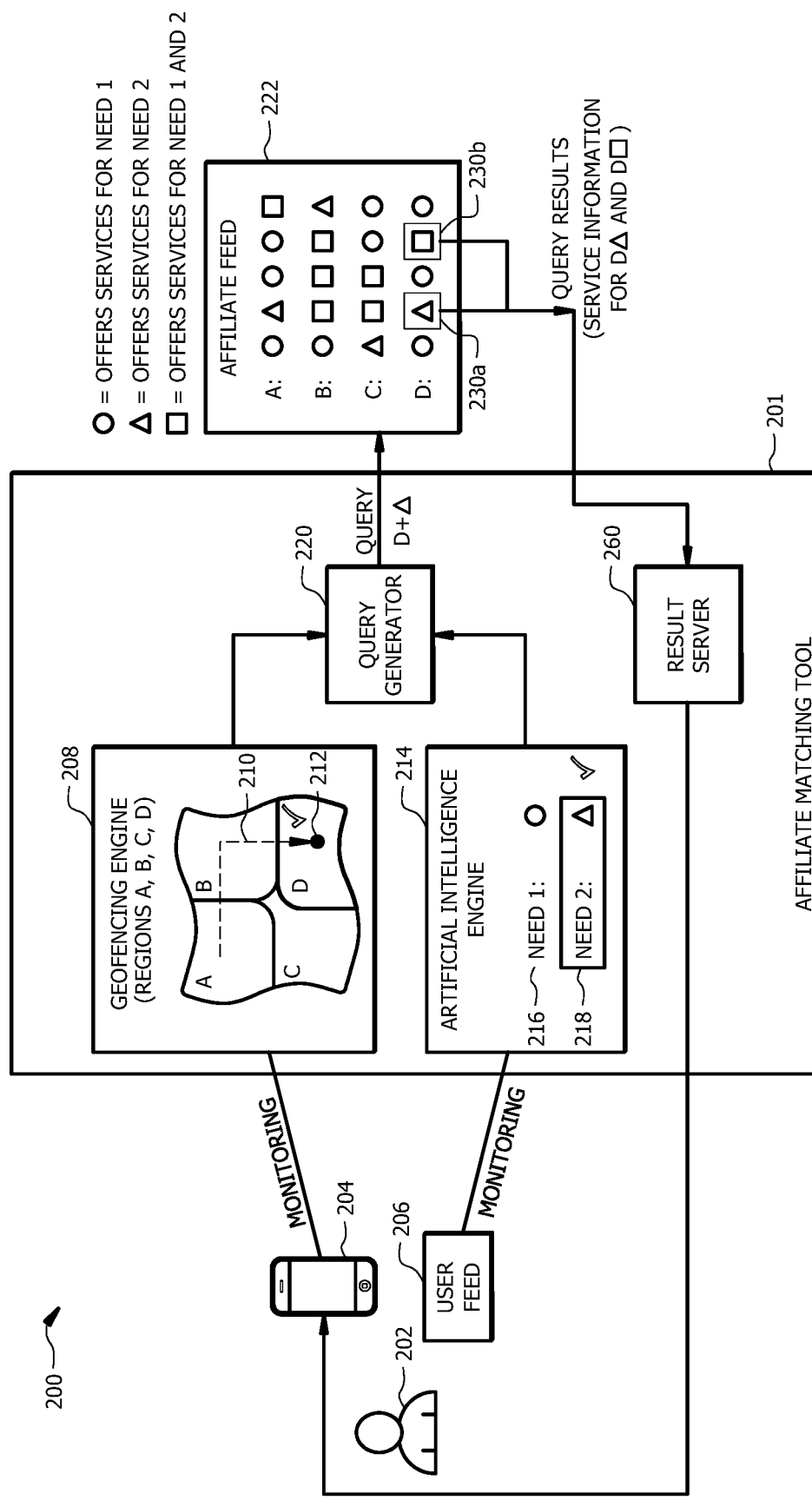
FIG. 2 is a flow diagram illustrating the determination and communication of affiliates and relevant services to a user device, according to an illustrative embodiment of the present disclosure.
Figure 3:
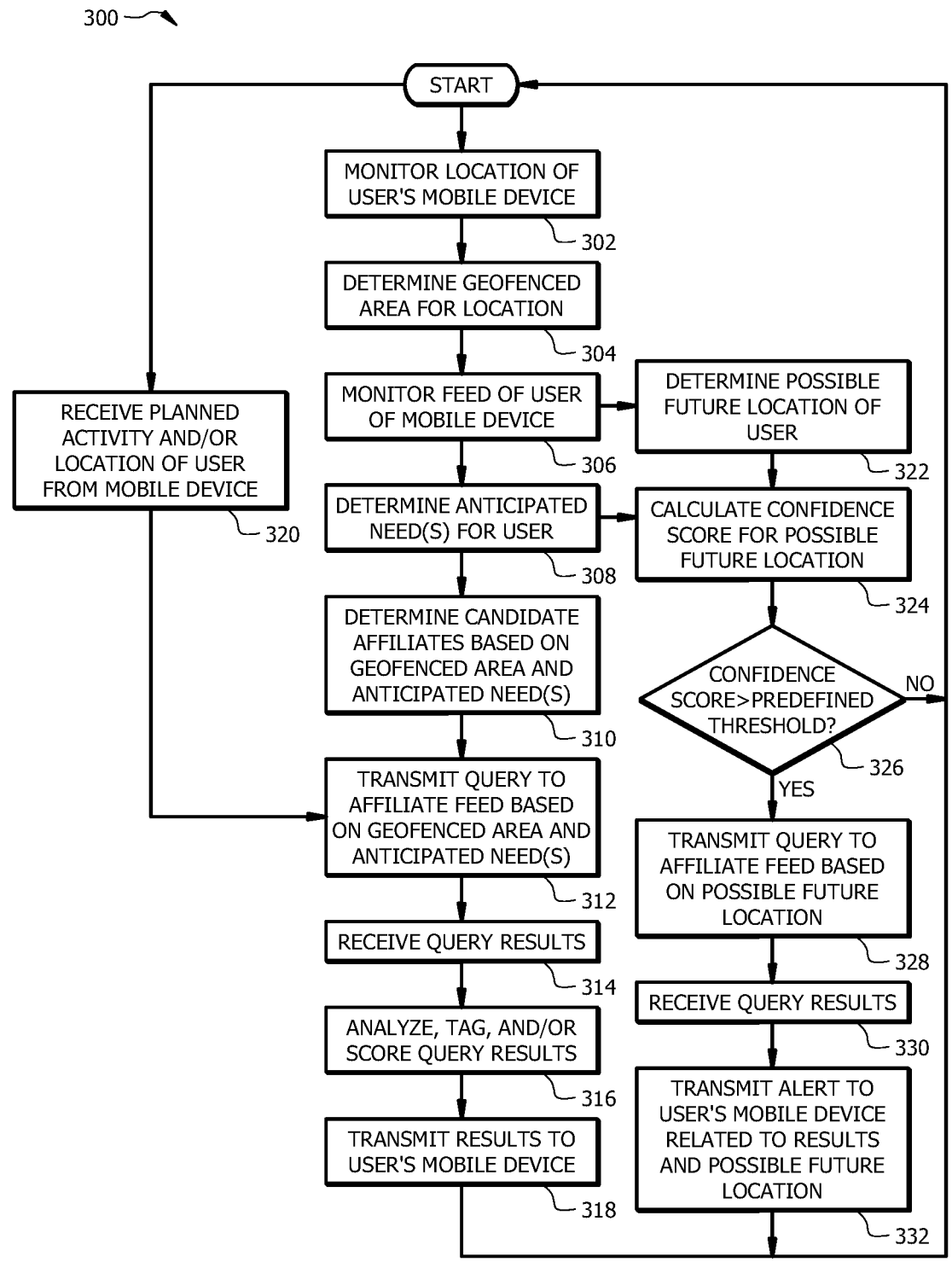
FIG. 3 is a flowchart illustrating an example method for affiliate matching, according to an illustrative embodiment of the present disclosure.

Embodiments of the present disclosure and its advantages are best understood by referring to FIGS. 1 through 3 of the drawings, like numerals being used for like and corresponding parts of the various drawings.

Conventional systems for matching users to affiliates rely on geolocation data alone to match users to nearby affiliates, and these systems have several drawbacks and disadvantages including those described above. Some conventional systems include a limited set of manually configurable parameters to sort or filter nearby affiliates and their services according to the user's needs. For example, a user may be presented with a list of restaurants near the user's current location, and this list may be sorted or filtered based on the user's preferences (e.g., on a type of cuisine desired by the user) using an appropriate user input (e.g., a selection of a cuisine type from a list). Conventional systems do not anticipate the user's needs or preferences.

An object of the present disclosure is to overcome drawbacks of previous technology. For instance, the present disclosure encompasses the recognition that geolocation data and data feed information can be dynamically monitored and combined to generate a dynamic user-specific query based on the user's location and anticipated need(s). As described in greater detail herein, this dynamic query is transmitted to a real-time affiliate feed to determine both appropriate affiliates for the user and affiliate service information that is related not only to the user's current location but also to the currently anticipated needs or preferences of the user. These user-specific results are served to the user's mobile device (e.g., via an application executed by the device) such that the user has immediate access to not only the most relevant affiliates but also additional information about the most user-relevant services offered by each affiliate.

FIG. 1 illustrates an example system 100, according to certain embodiments of the present disclosure. System 100 includes an affiliate matching tool 102, a network 110, an affiliate feed 120, as well as mobile devices 116a-c and user feeds 114a-c for users 112a-c. In general, the affiliate matching tool 102 monitors geolocation data from mobile devices 116a-c and information in user feeds 114a-c to dynamically determine and serve user-specific affiliate information to each of users 112a-c (e.g., via a mobile application executed on devices 116a-c). A geofencing engine 106 is used to determine a geographical region (e.g., a geofenced area) associated with each of users 112a-c, and this geographical region is used to determine a set of initial candidate affiliates 122, 124, 126 for the region based on information in an affiliate database 104 (i.e., a database of affiliates by region). An artificial intelligence engine 108 determines anticipated needs of users 112a-c using information from user feeds 114a-c (e.g., where the user feeds 114a-c may include a social media feed, a news feed, a repository of user account information, or the like). A subset of the initial candidate list (e.g., where the subset includes affiliates 122 and 126 in the example of FIG. 1) is then identified based at least in part on the anticipated needs of users 112a-c and served to mobile devices 116a-c via an application executed on devices 116a-c.

The affiliate matching tool 102 includes a memory 130 and a processor 132. The memory 130 stores the affiliate database 104, the geofencing engine 106, and the artificial intelligence engine 108. The geofencing engine 106 is generally operable to determine, for a given device of the mobile devices 116a-c, whether the device is located within a predefined geofenced area corresponding to a geographical region, using geolocation data from the device. Geolocation data can generally include global positioning system (GPS) data (i.e., location information from a GPS chip installed in the mobile device), cellular location data (i.e., location information based on cell tower triangulation), GPS data, and/or data from one or more WiFi positioning systems (i.e., location information based on the detected usage of WiFi hotspots at known locations). Generally, the geofencing engine 106 is also operable, using the geolocation data, to determine whether the mobile devices 116a-c have moved within a given geofenced area or between two or more geofenced areas (e.g., by crossing one or more virtual perimeters, or geofences, separating geofenced areas). The geofencing engine 106 may also be operable to determine a path traveled by users 112a-c within, between, or among one or more geofenced areas.

The affiliate database 104 includes information about affiliates for different predefined geographical regions (i.e., for different geofenced areas) and is generally used by the tool 102 to determine an initial list of candidate affiliates based on the current geofenced area determined by the geofencing engine 106. Processor 132, or one or more other processors (not shown), may be configured to execute instructions to implement the geofencing engine 106 stored in memory 130. In some embodiments, the geofencing module 106 is implemented using logic units, FPGAs, ASICs, DSPs, or any other suitable hardware.

Affiliate database 104 stores one or more tables of information for a plurality of affiliates associated with the affiliate matching tool 102. As an example, affiliates may include a plurality of service providers that are partnered with, or otherwise affiliated with, an entity operating the affiliate matching tool 102. Affiliate database 104 may store information arranged in any appropriate format. The initial candidate list is typically determined based on the geolocation data alone and, thus, may include more entries than the users 112a-c can manageably review each candidate for the selection of an appropriate affiliate. In other embodiments, the initial candidate list is determined based on the geolocation data and information determined by the artificial intelligence engine 108.

The artificial intelligence engine 108 facilitates the determination of a subset of the initial candidates identified in the affiliate database 104. Processor 132, or one or more other processors (not shown), may be configured to execute instructions to implement the artificial intelligence engine 108 stored in memory 130. In some embodiments, the artificial intelligence module 108 is implemented using logic units, FPGAs, ASICs, DSPs, or any other suitable hardware. The artificial intelligence engine 108 monitors user feeds 114*a-c* to determine anticipated need(s) for each user 112*a-c*. The anticipated need(s) are used to identify one or more affiliates that are appropriately located (e.g., nearby the users 112*a-c*) and that offer services for the anticipated needs of the users 112*a-c*. The user feeds 114*a-c* may include social media feeds, news feeds, websites, or any other network-connected data source(s) or stream(s) that provide information which may be used by the artificial intelligence engine 108 to determine anticipated needs, activities, or preferences of users 112*a-c*.

Processor 132 is any electronic circuitry, including, but not limited to microprocessors, application specific integrated circuits (ASIC), application specific instruction set processor (ASIP), and/or state machines, that communicatively couples to memory 130 and controls the operation of affiliate matching tool 102. Processor 132 may be 8-bit, 16-bit, 32-bit, 64-bit or of any other suitable architecture. Processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 132 may include other hardware and software that operates to control and process information. Processor 132 executes software stored on memory 130 to perform any of the functions described herein. More particularly, processor 132 controls the operation and administration of affiliate matching tool 102 by processing information received from first data sources 135*a,b*, second data sources 150*a,b*, device 160, network 130, and memory 130. Processor 132 may be a programmable logic device, a microcontroller, a microprocessor, any suitable processing device, or any suitable combination of the preceding. Processor 132 is not limited to a single processing device and may encompass multiple processing devices.

The processor 132 is configured to implement various instructions (e.g., stored in memory 130). For example, the processor 132 may be configured to execute instructions to implement the geofencing engine 106 and artificial intelligence engine 108. In this way, processor 132 (i.e., the processing circuitry of processor 132) may be a special-purpose computer designed to implement the functions disclosed herein, such as some or all of method 300 described with respect to FIG. 3 below. In an embodiment, the geofencing engine 106 and artificial intelligence engine 108 are each implemented using logic units, FPGAs, ASICs, DSPs, or any other suitable hardware.

Memory 130 may store, either permanently or temporarily, data, operational software, or other information for processor 132. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory, a disk, a CD, or a flash drive. In particular embodiments, the software may include an application executable by processor 132 to perform one or more of the functions described herein. The memory 130 may include one or more database (s) (not shown), each of which may generally include information used by the affiliate matching tool 102 such as one or more tables. This disclosure contemplates the databases storing information arranged in any format. For example, databases may store files, directories, and/or queues. The memory 130 may store training data for training the artificial intelligence engine 108. This training data may be continuously stored and updated during operation of affiliate matching tool 102 for continuous or otherwise ongoing training of the artificial intelligence engine 108.

Network 110 facilitates communication between and amongst the various components of system 100. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Each of devices 116*a-c* may be any device capable of recording geolocation data and transmitting the geolocation data via network 110 such that the locations of the devices 116*a-c* may be monitored by the affiliate matching tool 102. For example, each of devices 116*a-c* may include a GPS chip for real-time determination of device location. Additionally or alternatively, the affiliate matching tool 102 may determine geolocation data for the devices 116*a-c* from cellular location data (i.e., location information based on cell tower triangulation) and/or data from one or more WiFi positioning systems (i.e., location information based on the detected usage of WiFi hotspots at known locations). In some embodiments, mobile device geolocation for devices 116*a-c* is received from a third-party provider of such data (e.g., a broker of mobile device geolocation data). The geolocation data may also include supplemental device information and/or user information (e.g., a user identifier) for linking the location information to the corresponding user 112*a-c*.

In general, this disclosure contemplates devices 116*a-c* being any appropriate devices for sending and receiving communications, including communications of geolocation data, over network 110. As an example and not by way of limitation, each of devices 116*a-c* may be a computer, a laptop, a wireless or cellular telephone, an electronic notebook, a personal digital assistant, a tablet, or any other device capable of receiving, processing, storing, and/or communicating information with other components of system 100. Devices 116*a-c* may also include a user interface, such as a display, a microphone, keypad, a fingerprint reader, or other appropriate terminal equipment usable by users 112*a-c*. In some embodiments, an application executed by devices 116*a-c* may perform functions described herein. Users 112*a-c* may provide input via the user interface to the application running on the corresponding device 116*a-c*.

Affiliate feed 120 receives the dynamic user-specific query from the affiliate matching tool 102 and returns corresponding results, which include affiliates and service information for the affiliates. In the illustrative example of FIG. 1, responsive to the query, the affiliate feed 120 communicates results that include affiliates 122 and 126 to the affiliate monitoring tool 102. In this example, affiliate 124 does not correspond to an anticipated need of the users 112a-c and, thus, is not included in the results. Affiliate feed 120 includes a database for storing one or more tables of information for affiliates 122, 124, 126 as well as other affiliates. Affiliate feed 120 may store information arranged in any format.

The information stored in affiliate feed 120 is generally updated regularly such that the information is current. For example, the affiliate feed may be updated by monitoring websites of the affiliates. The affiliates may, in some embodiments, be able to update their profile in the feed to keep it up to date. Comments from other users may be used to update information stored in the affiliate feed 120. For example, data updates may be distributed (e.g., pushed) to affiliate feed 120 by computing device operated by the affiliates. In some cases, the affiliate feed 120 may transmit a message to affiliates (e.g., after a certain time interval of inactivity of, for example, a week, a month, two months, or more) to request that the affiliate information, including affiliate service information, is reviewed and updated as needed.

In an example operation of system 100, the affiliate matching tool 102 matches user 112a to affiliates 122 and 126 based on the location of user 112a and an anticipated need of the user 112a. In this example, the anticipated need is to purchase ice cream. For example, user 112a may publish (or "post") a message to a social media feed indicating a desire to purchase ice cream. Such a post be, or may be similar to, "I want some ice cream." The artificial intelligence engine 108, monitoring this social media feed and responsive to such a post, determines that user 112a is likely to need an affiliate that offers ice cream for sale. The artificial intelligence engine 108 then determines that "purchasing ice cream" is an anticipated need for user 112a. Meanwhile, the geofencing engine 106, which continuously monitors the location of the user's mobile device 116a, determines a geofenced area corresponding to the current location of user 112a.

Still referring to this illustrative example, the current location is used in combination with the anticipated need of the user 112a to determine a set of initial candidate affiliates for the user 112a. For example, the initial candidate affiliates may be nearby companies known or believed to sell ice cream. In may be particularly advantageous, in certain embodiments, to combine information from the geofencing engine 106 and artificial intelligence engine 108 to identify as refined as possible of an initial candidate list from the affiliate database 104. However, in other embodiments, the affiliates are satisfactorily refined during subsequent processes by accessing the affiliate feed 120.

Generally, the anticipated need for "purchasing ice cream" (determined by the artificial intelligence engine 108) is combined with the candidate affiliates identified from database 104 to generate a query for "purchasing ice cream at the candidate affiliates." This query is transmitted to the affiliate feed 120 for further identification of available affiliate services corresponding to the user's current need and location. As described above, the affiliate feed 120 includes verified information about the current, or most up-to-date, services offered at each affiliate. Current services offered by these affiliates are used to determine whether each candidate affiliate is appropriate for both the anticipated needs of user 112a and the location of device 116a. Based on this determination, a subset of the initial candidate affiliates is identified that are best suited to the user 112a. In the example of FIG. 1, initial affiliates 122, 124, 126 are refined to a subset that includes affiliates 122 and 126, which are most relevant to the user's location and anticipated needs. The results of the query are served to the user's mobile device 116a to be viewed by user 112a via an application executed on device 116a. Thus, with little or no user input, the affiliate matching tool 102 effectively and preemptively matches user 112a to relevant affiliates 122, 126.

In some embodiments, the artificial intelligence engine 108 determines additional related information for further improvements to the affiliate matching described above. For the example of "purchasing ice cream" described above, user feed 114a may include additional information about related needs or preferences of user 112a. The user feed 114a may include complementary information for determining additional information about the user's anticipated need(s), such as with respect to dietary restrictions of the user 112a. For example, a social media post from the user may include the phrases "strawberry allergy" or "lactose intolerance;" the user 112a may be known to subscribe to news sources related to these issues; and/or the user 112a may be known to have accessed or posted comments on websites related to treatments of these issues. The artificial intelligence engine 108 may, based on any or all of this information, determine that the user 112a is likely lactose intolerant and/or likely suffers from a strawberry allergy, and the query transmitted by the affiliate matching tool 102 may be modified accordingly to determine affiliates offering appropriate ice cream products for the user's more specialized needs. The affiliate matching tool 102 may also serve information related to these issues to the user 112a (e.g., comments from other users related to lactose-free products at a given affiliate).

Referring to yet another embodiment, the affiliate matching tool 102 can use information from the user feeds 114a-c and the geolocation data from the mobile devices 116a-c to determine likely future locations of the users 112a-c and anticipated need(s) in the locations. This information is then used to determine affiliates from the affiliate feed 120 that match these prospective criteria. These affiliates and the corresponding service information are served to the users 112a-c via their corresponding mobile devices 116a-c. The affiliate matching tool 102 may serve these results as an alert or other electronic communication. The alert may also include other information related to the likely future location and anticipated need. For example, the affiliate matching tool 102 may provide information about forecasted weather conditions in the likely future location (or en route to the likely future location), information about travel between the current and likely future location (e.g., directions, available modes of transportation, etc.), and the like. Thus, in some embodiments, the affiliate matching tool 102 matches users to affiliates based not only on a current location of the user but also based on a likely future location of the user.

As yet another example of the operation of the system 100 shown in FIG. 1, the affiliate matching tool 102 may be used to match users of a primary service provider to affiliated service providers (e.g., affiliated providers operating in a foreign location) that have a partnership or a cooperative relationship with the primary service provider. Affiliated providers may include one or more affiliated branches of the primary service provider or distinct providers with appropriate agreements in place with the primary provider. The affiliate matching tool 102 can be used to more effectively match these affiliates and their services to users 112a-c.

Still referring to this exemplary use of the affiliate matching tool 102, the user feeds 114a-c may include not only information in publicly accessible accounts (e.g., news and social media accounts) but also other information (e.g., personal information) stored in a repository for the users 112a-c. The affiliate matching tool 102 may monitor the social media account of user 112a to determine based on a post related to upcoming vacation travel that the user 112a is likely to travel to a different city where the primary service provider does not operate. Based on this information, the affiliate matching tool 102 may determine that the user 112a will likely need services (e.g., to withdraw cash from an account) in the different location. Responsive to this determination, the affiliate matching tool 102 transmits a query corresponding to this need and the likely location of the user 112a to the affiliate feed 120 in order to identify affiliates in the location where the user 112a can obtain the services (e.g., withdraw cash).

In this example, the results from the query may include the identified affiliates along with related service information (e.g., withdrawal fees, exchange rates, and the like). The results may be served to the mobile device 116a (e.g., via an application executed in device 116a) as a preemptive message indicating affiliate services for the user's anticipated needs. The preemptive message can include supplemental information such as addresses or coordinates of the affiliates and a comparison of costs associated with services offered by the affiliates. If no results are returned (i.e., if no appropriate affiliates are identified in affiliate feed 120 for the possible location and/or anticipated needs of the user 112a), the preemptive message may include an alert or warning that needed services may be unavailable (e.g., a warning to withdraw cash before traveling).

FIG. 2 is a flow diagram 200 illustrating the matching of user 202 to affiliates 230a,b using affiliate matching tool 201. In the example of FIG. 2, the affiliate matching tool 201 monitors mobile device 204 and user feed 206 of user 202. The affiliate matching tool includes a geofencing engine 208, an artificial intelligence engine 214, a query generator 220, and a result server 260.

The geofencing engine 208 generally monitors the location of device 204. As shown in FIG. 2, geofencing engine 208 determines that the mobile device 204 is located at point 212 within geofenced area D. Meanwhile, the artificial intelligence engine 214 generally monitors the user feed 206 to determine anticipated need(s) of user 202. In the example of FIG. 2, the artificial intelligence engine 214 determines, based on the user feed 206, that user 202 has a second anticipated need 218 rather than a first anticipated need 216. In some embodiments, the geofencing engine 208 determines if the user 202 has traveled along a particular path 210 between two or more of the geofenced areas A, B, C, and D. Path 210 can be combined with information from user feed 206 to further improve the determination of the anticipated need(s) of user 202 by artificial intelligence engine 214.

The geographical information from the geofencing engine 208 is combined with the anticipated need(s) of the user 202 by the query generator 220 and transformed into a dynamic user-specific query that is transmitted to the affiliate feed 222. As illustrated in FIG. 2, the affiliate feed 222 includes information about which services are offered at different affiliates within each geofenced area A, B, C, and D. Responsive to the query, the affiliate feed 222 returns the results to a result server 260. The results include affiliates 230a,b that are located within geofenced area D and offer services related to the anticipated need 218 of user 202. The result server 260 serves the results to the device 240 of user 202. The user 202 can view results in an application executed on device 204.

FIG. 3 shows a flowchart illustrating an example method 300 used by the affiliate matching tool described herein. Method 300 generally facilitates the matching of affiliates to a user based on geolocation data from the user's mobile device 116a and information in a user feed 114a associated with the user 112a.

In step 302, the affiliate matching tool 102 monitors the location of the user's mobile device 116a. For example, monitoring the location of the user's mobile device may include (1) receiving location data from the user's device (e.g., from an application executed on the device) and (2) processing the location data to determine geographic coordinates (e.g., a latitude-longitude pair) corresponding the location of the device.

In step 304, the location of mobile device 116a is used to determine a geofenced area corresponding to the location of the device 116a of user 112a. For example, an algorithm used by the geofencing engine 106 may be executed to (1) access the current location of the device 116a and a geofencing database comprising a plurality of predefined geofenced areas, (2) compare the current location to the predefined geofenced areas, and (3) determine, based on this comparison, a geofenced area for the current location (e.g., a geofenced area comprising the current location within its boundaries). For example, the geofencing engine 106 may compare the current location to the predefined geofenced areas by: (1) accessing coordinates (e.g., a latitude and longitude) for the current location, (2) accessing coordinate ranges (e.g., ranges of latitude and longitude) for each of the predefined geofenced areas, and (3) determining whether the coordinates for the current location are (i) within the coordinate range for each geofenced area, (ii) near the coordinate range for each geofenced area (e.g., within less than 5, 10, 15, or 25 miles of the coordinate range), or distant from the coordinate range for each geofenced area (e.g., greater than 5, 10, 15, or 25 miles from the coordinate range).

In step 306, the affiliate matching tool 102 monitors user feed 114a of user 112a, using the artificial intelligence engine 108. As an example, the affiliate matching tool 102 may access (e.g., via an appropriate network interface) the user feed 114a and retrieve information stored in the user feed 114a, thereby providing a stream of user feed data to the affiliate matching tool 102. In step 308, the artificial intelligence engine 108 determines anticipated need(s) of the user 112a based on this stream of data from the user feed 114a. For example, the artificial intelligence module may (1) identify one or more portions of the information that are associated with predefined user needs, (2) calculate a "matching probability" that the one or more portions are related to each predefined user need, and (3) determine the anticipated need for the user 112a as the predefined need with the highest "matching probability." The artificial intelligence engine 108 may be trained to calculate the "matching probability" using a training database that includes example user feed data, where each portion of user feed data is associated with one or more predefined user needs and each need has an associated probability of being related to the portion of user data. Thus, the artificial intelligence engine 108 can receive user feed data as an input and provide, for each portion of the user data, one or more corresponding anticipated needs along with a probability score for each need as an output.

In step 310, the affiliate matching tool 102 may determine initial candidate affiliates based on the geofenced area determined in step 304 and information stored in the affiliate database 104. For example, the affiliate matching tool 102 may access information in the affiliate database corresponding to affiliate locations and (2) identify candidate affiliates within a threshold distance (e.g., of within 5, 10, 15, 25, 50, or 100 miles) of the location of the user's mobile device 116*a*.

In step 312, the affiliate matching tool 102 transmits a user-specific query to the affiliate feed 120, where the query is based at least in part on the geofenced area (determined in step 304) and the anticipated need(s) of the user 112*a* (determined in step 308). In general, information from the geofencing engine 106 and the artificial intelligence engine 108 are combined and transformed to create a query (e.g., using query generator 220 shown in FIG. 2). For example, the affiliate matching tool 102 may (1) access the geolocation data, the initial candidate affiliates, and the anticipated need(s) of the user 112*a* (as determined above) and (2) combine each of these to generate a query that can be interpreted by the affiliate feed 120. For example, an anticipated need of "Need A" may be combined with a location from the location data corresponding to "Location B" to generate a query of "Affiliates in Location B providing services for Need A?"

In step 314, results of the query are received by the affiliate matching tool 102. Receiving the query results may include (1) receiving a message from the affiliate feed 120, (2) unpacking the message, and (3) identifying results corresponding to the query in the unpacked message. The results generally include affiliates and affiliate services related to the location and anticipated need(s) of the user 112*a*. In step 316, these results may be analyzed by the affiliate matching tool 102. The affiliate matching tool may, for example, tag or score the results (e.g., to facilitate future organization, searching, or comparison of the results).

In step 318, the affiliate matching tool 102 transmits the results to the mobile device 116*a*. Transmitting the results may include, for example, (1) processing the results to generate user-readable results in an appropriate format for the mobile device 116*a* and (2) sending a message to the user device (e.g., via an appropriate network interface), where the message includes the user-readable results. The affiliate matching tool 102 then continues to monitor the location of the user's mobile device. In some embodiments, the affiliate matching tool 102, in step 320, receives a planned activity or planned location of the user 112*a* (e.g., a user-initiated query) from the mobile device 116*a*. For example, the user 112*a* may provide an input via an application executed on his/her mobile device 116*a* to indicate plans to travel to a certain location or to need a given service. The application may also allow the user to input a range of preferences (e.g., preferences related to the types of services the user prefers to use and the properties of these services). The affiliate matching tool may use this user-provided information in step 312 to transmit a query to the affiliate feed 120. The method 300 then proceeds through steps 312-318 described above to provide results of the query that include services for the planned need(s) and location of the user 112*a*.

In some embodiments, the affiliate matching tool 102, in step 322, determines a possible (e.g., anticipated) future location of the user 112*a* based on the user feed 116*a* using the artificial intelligence engine 108. For example, the artificial intelligence engine 108 may monitor a social media feed of the user 112*a* and, based on a post indicating an upcoming vacation to a different location, determine that the user 112*a* is likely to visit the different location. In other words, in this illustrative embodiment, the affiliate matching tool 102 anticipates not only the user's needs but also a future location of the user. As described with respect to steps 322-332, an alert mechanism may be initiated to provide user-specific information about affiliates and services in the possible future location.

In step 324, the affiliate matching tool 102 may calculate a confidence score for the anticipated need(s) determined in step 308 and/or the possible future location determined in step 322. The confidence score may be based on the amount and/or type of information used to make the determinations in steps 308 and 322. For instance, the confidence score my calculated by: (1) determining a first source of evidence (e.g., text posted to a social media feed) for a first predefined need, (2) determining a second source of evidence (e.g., text posted to a social media feed) for second predefined need, (3) using a set of known relationships (e.g., stored in memory 130) between the predefined needs to determine an extent to which the first predefined need is similar to, or the same as, the second predefined need. For example, if a social media post indicating an upcoming vacation to a different location is followed by a second post that includes confirmatory information for the anticipated location (e.g., a post indicating the purchase of a ticket for a flight to the location), the artificial intelligence engine 108 may calculate a high confidence score for the possible future location.

In step 326, the confidence score is compared to a threshold confidence level. For example, the confidence threshold level may correspond to the minimum certainty required to initiate the alert mechanism comprised of steps 322 through 332 of method 300. If the confidence score is less than the threshold, the affiliate matching tool 102 returns to the start of method 300 to monitor the location of device 116*a* of user 112*a*. Otherwise, if the confidence score is greater than or equal to the threshold, the affiliate matching tool 102 proceeds to step 328 to transmit a query, based on the possible future location, to the affiliate feed 120. The query is based at least in part on the possible future location of the user 112*a*. In step 330, the affiliate matching tool 102 receives the results of this query, similarly to as described with respect to step 314.

In step 332, an alert that includes the query results is transmitted to the mobile device 116*a* of user 112*a*. The alert, for example, may include affiliates and corresponding affiliate services available in the possible future location. The alert may also include information to facilitate safe and efficient travel between the current location of user 112*a* (determined by geofencing engine 106) and the likely future location of user 112*a* (determined by artificial intelligence engine 108).

Modifications, additions, or omissions may be made to method 300 depicted in FIG. 3 without departing from the scope of the present disclosure. Method 300 may include more, fewer, or other steps, and these steps may be performed in parallel or in any suitable order. While discussed primarily as affiliate matching tool 102 (or components thereof) performing the steps, any suitable component of the system 100, such as user devices 116*a*-*c*, may perform one or more steps of method 300. Method 300 may also be used by an affiliate matching tool according to any other embodiment described herein, including affiliate matching tool 201 shown in FIG. 2.

As described above, the systems, methods, and apparatus of the present disclosure provide various advantages for matching affiliates to users. It should be understood that these examples are presented for illustrative purposes. Any particular advantage described herein does not need to be achieved in order to realize a benefit from the systems, methods, and apparatus described herein.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus for matching one or more affiliates to a user, the apparatus comprising:
a memory configured to store an affiliate database;
a geofencing engine configured to:
dynamically monitor location data of a mobile device of a user; and
determine a current geofenced area of the mobile device based on the location data;
an artificial intelligence engine configured to:
dynamically monitor an information feed of the user; and
determine an anticipated need of the user; and
a processing circuitry communicatively coupled to the memory, the geofencing engine, and the artificial intelligence engine, the processing circuitry configured to:
determine, using the affiliate database, a list of candidate affiliates for the current geofenced area;
transmit a query to an affiliate feed for the list of candidate affiliates, the query based at least in part on the anticipated need of the user; and
determine a first affiliate and a second affiliate based on the query;
receive query results for the first affiliate and the second affiliate from the affiliate feed, the query results comprising:
first service information comprising currently available services at the first affiliate, and
second service information comprising currently available services at the second affiliate;
transmit the first service information and the second service information to the mobile device for presentation in a user interface of the mobile device; and
determine, using the affiliate database, the list of candidate affiliates for the current geofenced area based on the anticipated need of the user.

2. The apparatus of claim 1, the processing circuitry configured to:
receive a request from the mobile device comprising a planned activity of the user;
transmit a user-initiated query to the affiliate feed, the query based at least in part on the planned activity of the user and the current geofenced area;
determine a third affiliate based on the user-initiated query;
receive user-initiated query results for the third affiliate from the affiliate feed, the user-initiated query results comprising third service information, the third service information comprising currently available services at the third affiliate; and
transmit the third service information to the mobile device for presentation in the user interface of the mobile device.

3. The apparatus of claim 1, the processing circuitry configured to:
receive a request from the mobile device comprising a planned activity of the user in a planned geofenced area;
transmit a location-specific query to the affiliate feed, the location-specific query based at least in part on the planned activity and the planned geofenced area;
determine a fourth affiliate based on the location-specific query;
receive location-specific query results from the affiliate feed, the location-specific query results comprising fourth service information, the fourth service information comprising currently available services for the planned activity at the fourth affiliate; and
transmit the fourth service information to the mobile device for presentation in the user interface of the mobile device.

4. The apparatus of claim 1, wherein the artificial intelligence engine is configured to:
determine a probable future location of the anticipated need of the user based at least in part on the monitored information feed; and
the processing circuitry is configured to:
determine, using the affiliate database, a second list of candidate affiliates for a probable geofenced area comprising the probable future location;
transmit a proactive query to the affiliate feed, the proactive query based at least in part on the anticipated need of the user and the probable future location of the activity;
determine a fifth affiliate based on the proactive query;
receive proactive query results from the affiliate feed for the fifth affiliate, the proactive query results comprising fifth service information comprising currently available services for the fifth affiliate; and
transmit the fifth service information to the mobile device for presentation in the user interface of the mobile device.

5. The apparatus of claim 4, wherein the processing circuitry is further configured to:
determine a confidence score for the probable future location and the anticipated need; and
based on a determination that the confidence score is greater than or equal to a predefined threshold, transmit an alert to the mobile device, the alert comprising an identification of the fifth affiliate and the fifth service information.

6. The apparatus of claim 1, wherein the information feed comprises information from at least one social media source.

7. A method for matching one or more affiliates to a user, the method comprising:
dynamically monitoring, by a processor of a computing device via a network, location data of a mobile device of a user;
dynamically monitoring, by the processor via the network, an information feed of the user;
determining, by the processor, a current geofenced area of the mobile device based on the location data;
determining, by the processor, an anticipated need of the user;
determining, by the processor, a list of candidate affiliates for the current geofenced area based on the geofenced area;
transmitting, by the processor, a query to an affiliate feed for the list of candidate affiliates, the query based at least in part on the anticipated need of the user;
determining, by the processor, a first affiliate and a second affiliate based on the query;
receiving, by the processor, query results for the first affiliate and the second affiliate from the affiliate feed, the query results comprising:

first service information comprising currently available services at the first affiliate, and
second service information comprising currently available services at the second affiliate;
transmitting, by the processor via the network, the first service information and the second service information to the mobile device for presentation in a user interface of the mobile device; and
determining, by the processor, the list of candidate affiliates for the current geofenced area based on the geofenced area and the anticipated need of the user.

8. The method of claim 7, further comprising:
receiving, by the processor, a request from the mobile device comprising a planned activity of the user;
transmitting, by the processor, a user-initiated query to the affiliate feed, the user-initiated query based at least in part on the planned activity of the user and the current geofenced area;
determining, by the processor, a third affiliate based on the user-initiated query;
receiving, by the processor, user-initiated query results for the third affiliate from the affiliate feed, the user-initiated query results comprising third service information, the third service information comprising currently available services at the third affiliate; and
transmitting, by the processor via the network, the third service information to the mobile device for presentation in the user interface of the mobile device.

9. The method of claim 7, further comprising:
receiving, by the processor, a request from the mobile device comprising a planned activity of the user in a planned geofenced area;
transmitting, by the processor, a location-specific query to the affiliate feed, the query based at least in part on the planned activity and the planned geofenced area;
determining, by the processor, a fourth affiliate based on the location-specific query;
receiving, by the processor, location-specific query results from the affiliate feed, the location-specific query results comprising fourth service information, the fourth service information comprising currently available services for the planned activity at the fourth affiliate; and
transmitting, by the processor via the network, the fourth service information to the mobile device for presentation in the user interface of the mobile device.

10. The method of claim 7, further comprising:
determining, by the processor, a probable future location of the anticipated need of the user based at least in part on the monitored information feed;
determining, by the processor, a second list of candidate affiliates for a probable geofenced area comprising the probable future location;
transmitting, by the processor, a proactive query to the affiliate feed, the proactive query based at least in part on the anticipated need of the user and the probable future location of the activity;
determining, by the processor, a fifth affiliate based on the proactive query;
receiving, by the processor, proactive query results from the affiliate feed for the fifth affiliate, the proactive query results comprising fifth service information comprising currently available services for the fifth affiliate; and
transmitting, by the processor via the network, the fifth service information to the mobile device for presentation in the user interface of the mobile device.

11. The method of claim 10, further comprising:
determining, by the processor, a confidence score for the probable future location and the anticipated need; and
responsive to a determination that the confidence score is greater than or equal to a predefined threshold, transmitting, by the processor via the network, an alert to the mobile device, the alert comprising an identification of the fifth affiliate and the fifth service information.

12. The method of claim 7, wherein the information feed comprises information from at least one social media source.

13. A computer program comprising executable instructions stored in a non-transitory computer readable medium that when executed by a hardware processor causes the processor to:
dynamically monitor, via a network, location data of a mobile device of a user;
dynamically monitor, via the network, an information feed of the user;
determine a current geofenced area of the mobile device based on the location data;
determine an anticipated need of the user;
determine a list of candidate affiliates for the current geofenced area based on the geofenced area;
transmit a query to an affiliate feed for the list of candidate affiliates, the query based at least in part on the anticipated need of the user;
determine a first affiliate and a second affiliate based on the query;
receive query results for the first affiliate and the second affiliate from the affiliate feed, the query results comprising:
first service information comprising currently available services at the first affiliate, and
second service information comprising currently available services at the second affiliate;
transmit, via the network, the first service information and the second service information to the mobile device for presentation in a user interface of the mobile device; and
determine, using the affiliate database, the list of candidate affiliates for the current geofenced area based on the geofenced area and the anticipated need of the user.

14. The computer program of claim 13, wherein the hardware processor is configured to:
receive a request from the mobile device comprising a planned activity of the user;
transmit a user-initiated query to the affiliate feed, the user-initiated query based at least in part on the planned activity of the user and the current geofenced area;
determine a third affiliate based on the user-initiated query;
receive user-initiated query results for the third affiliate from the affiliate feed, the user-initiated query results comprising third service information, the third service information comprising currently available services at the third affiliate; and
transmit the third service information to the mobile device for presentation in the user interface of the mobile device.

15. The computer program of claim 13, wherein the hardware processor is configured to:
receive a request from the mobile device comprising a planned activity of the user in a planned geofenced area;
transmit a location-specific query to the affiliate feed, the location-specific query based at least in part on the planned activity and the planned geofenced area;

determine a fourth affiliate based on the location-specific query;

receive location-specific query results from the affiliate feed, the location-specific query results comprising fourth service information, the fourth service information comprising currently available services for the planned activity at the fourth affiliate; and transmit the fourth service information to the mobile device for presentation in the user interface of the mobile device.

16. The computer program of claim 13, wherein the hardware processor is configured to:

determine a probable future location of the anticipated need of the user based at least in part on the monitored information feed; and the processing circuitry is configured to:

determine, using the affiliate database, a second list of candidate affiliates for a probable geofenced area comprising the probable future location;

transmit a proactive query to the affiliate feed, the proactive query based at least in part on the anticipated need of the user and the probable future location of the activity;

determine a fifth affiliate based on the proactive query;

receive proactive query results from the affiliate feed for the fifth affiliate, the proactive query results comprising fifth service information comprising currently available services for the fifth affiliate; and transmit the fifth service information to the mobile device for presentation in the user interface of the mobile device.

17. The computer program of claim 16, wherein the hardware processor is configured to:

determine a confidence score for the probable future location and the anticipated need; and based on a determination that the confidence score is greater than or equal to a predefined threshold, transmit an alert to the mobile device, the alert comprising an identification of the fifth affiliate and the fifth service information.

* * * * *